E. J. WINTER.
APPARATUS FOR DISTILLING.
APPLICATION FILED JUNE 13, 1918.
1,427,887.
Patented Sept. 5, 1922.
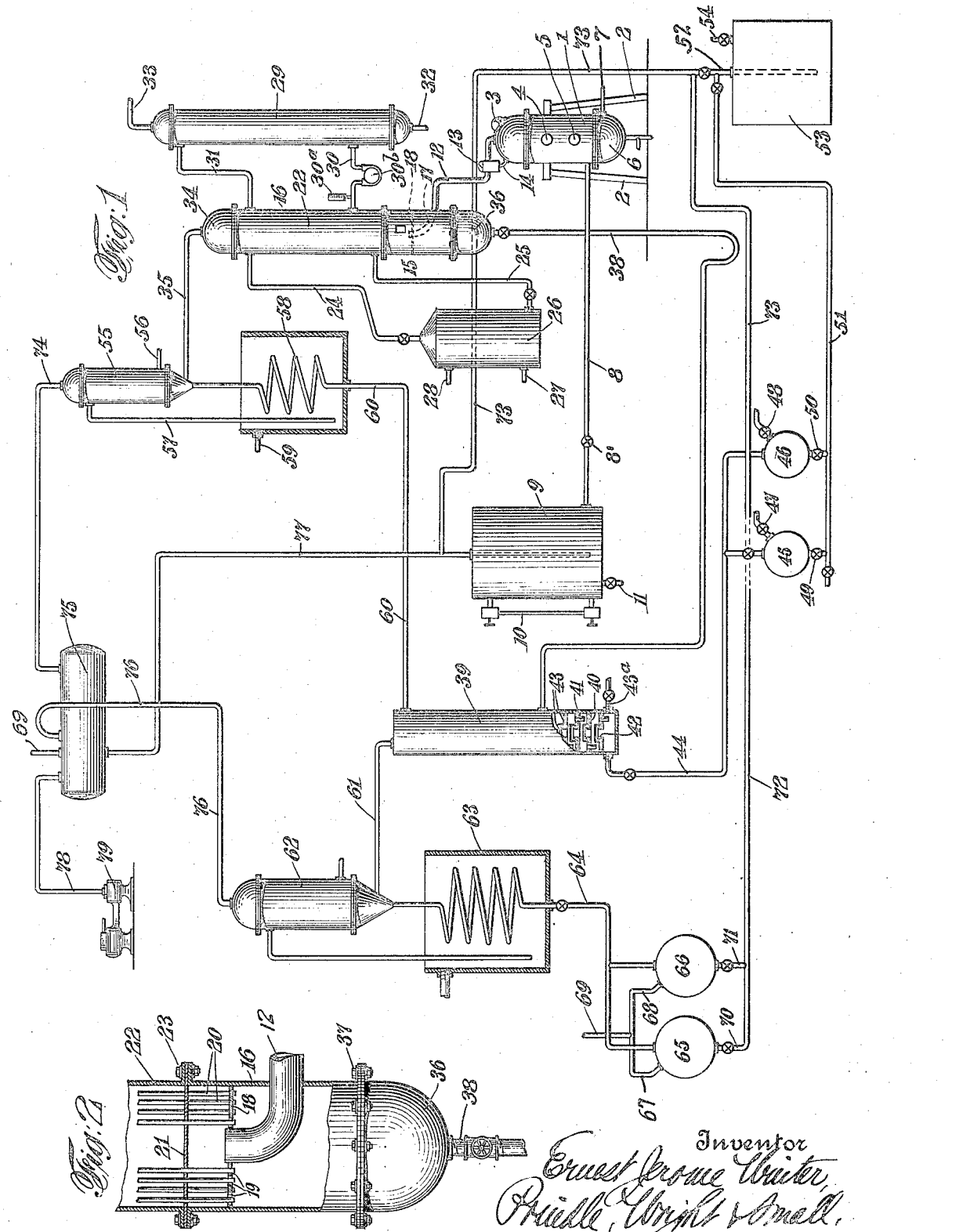

Patented Sept. 5, 1922.

1,427,887

UNITED STATES PATENT OFFICE.

ERNEST JEROME WINTER, OF BALTIMORE, MARYLAND, ASSIGNOR TO U. S. INDUSTRIAL ALCOHOL CO., A CORPORATION OF WEST VIRGINIA.

APPARATUS FOR DISTILLING.

Application filed June 13, 1918. Serial No. 239,755.

*To all whom it may concern:*

Be it known that I, ERNEST JEROME WINTER, of Baltimore, in the State of Maryland, have invented a certain new and useful Improvement in Apparatus for Distilling, and do hereby declare that the following is a full, clear, and exact description thereof.

My invention relates particularly to an apparatus adapted to be used in distilling, but it has reference especially to the distillation of alcohol.

The object of my invention is to provide an apparatus by which distillates of a high degree of purity and strength may be obtained, and especially to provide a distilling apparatus by which a very high proof alcohol, or absolute alcohol, may be obtained.

A further object of my invention is to provide an apparatus of the above character in which the distillates referred to may be readily obtained at a minimum cost and with a minimum amount of labor.

Hitherto, in the distillation of alcohol, owing to the use of atmospheric pressures and columns, alcohol of a greater strength than about 95.4% could not be obtained, for the reason that at atmospheric pressures, when the strength of the alcohol being distilled or rectified has reached 95.4%, the vapor produced under these conditions would have the same strength. Furthermore, in the said processes, if any attempt were made to apply a vacuum, this would be ineffective because of the fact that the columns would prevent the vacuum from acting to any great degree below the first few pans at the top of the column connected with the vacuum pump, inasmuch as there are liquid seals between the several pans which gradually increase the head of liquid between the upper and lower portions of each column.

The object of my invention is, therefore, to obviate the disadvantages inherent in previous apparatuses provided for distilling alcohol, and particularly to provide an apparatus in which a vacuum may be readily applied, so that advantage may be taken of the fact that under the influence of a vacuum the vapors obtained from alcohol having a strength of 95.4% or higher contain even a larger percentage of alcohol than the liquid from which said vapors are derived.

Still another object of my invention is to provide an apparatus of this nature in which a body of alcohol of increasing strength is brought into contact with a body of vapor, also of increasing strength but which has a lower strength than the body of vapor that would be derived from and be in equilibrium with the portion of said body of alcohol with which it would be in contact at any one time.

That is to say, the object of my invention is particularly to provide an apparatus of this kind in which there is an advancing film of alcohol, having a progressively increasing strength toward its rearmost portion, which is brought in contact with an advancing current of alcohol vapors having a strength which increases towards its foremost portion, the two currents of liquid and vapors being conveyed in opposite directions, and the strength of the alcohol vapors at any given point being less than the strength of the vapor which would be in equilibrium with the liquid at that point, but greater than the strength of the liquid itself, so that as the current of vapor advances it will become richer in alcohol, while the current of liquid as it advances will become poorer in alcohol.

A further object of my invention is to treat in this manner vapors obtained from an alcohol still and to remove the weakened or residual liquid thereafter to a column rectifier, in which substantially all of the alcohol vapors are removed from the liquid, so that in this way the apparatus may be used for distilling alcohol of a low degree of strength, that is, 20% or lower, as for example 5%.

Further objects of my invention will appear from the detailed description thereof contained hereinafter.

While my invention is capable of being carried out in many different ways, for the purpose of illustration I have shown only one form of my apparatus in the accompanying drawings, in which Figure 1 is a diagrammatic representation, partly in section, showing an apparatus made in accordance with my invention; and Figure 2 is an enlarged detail of the tubular rectifier.

In the drawings, I have shown an alcohol still 1, carried upon any suitable framework 2, and which is provided with a manhole 3, two glass windows 4 and 5 for viewing the progress of the distillation, a steam heating jacket 6 provided with a steam inlet pipe 7, a feed pipe 8 having a valve 8' for the inlet of weak alcohol, as for example 5% alcohol, the same being connected with a supply tank 9, having a gauge 10, and a drain-pipe 11. A vapor outlet pipe 12 is provided at the top of the still 1, the same being connected with a foam trap 13, having a return pipe 14 to said still. The vapor outlet pipe 12 leads into a lower section 15 of a tubular rectifier 16, and has at its extreme end an upwardly bent portion 17, which passes through a diaphragm 18 extending across said lower section 15, which diaphragm 18 has a plurality of holes 19 to receive the lowermost ends of a number of vertically arranged tubes 20 extending upwardly in said rectifier 16. To favor fractionation by providing a tortuous path for the vapors being evacuated the holes 19 are larger than the external diameters of the tubes 20, so as to provide outlets for the alcohol vapors in a downward direction through the diaphragm 18, it being important effectively to distribute the alcohol vapors in the lower section 15 prior to the entry of the same into the lower ends of the tubes 20 through which the descent of condensate is unobstructed. Said tubes 20 are held in place near their lower ends by means of a plate 21, through which they pass, and in which they are tightly secured, said plate 21 being located at the upper end of the lower section 15, and being secured thereto, as well as to an upper rectifier section 22, by means of bolts 23. Said upper rectifier section 22, carrying a plate similar to plate 21, into which tubes are tightly secured, is connected by means of valved pipes 24 and 25 to a preheater 26, which is adapted to be supplied with steam by means of pipes 27 and 28. The preheater is designed to be used only when starting the operation of the apparatus, so as to provide in the upper section of the rectifier 22 the desired temperature from the beginning of the operation thereof. After the desired temperature has been reached, the preheater 26 will be thrown out of operation by the closing of its valves, and thereafter a cooler 29 will be brought into operation, which cooler is connected by pipes 30 and 31 to said upper section 22, said pipe 30 having therein a thermostat 30ª and a circulating pump 30ᵇ which as occasion may require circulates a current of cooling water in the upper section 22. The cooler 29 which may be of usual type is supplied with cold water by means of pipes 32 and 33. At the upper end of the upper section 22, there is a cover 34, having a vapor outlet pipe 35 secured to the top thereof. Attached to the lower end of the lower section 15 there is a cover 36, secured thereto by means of bolts 37, and having extending downwardly therefrom a valved pipe 38, which leads to about the middle portion of a rectifying column 39, comprising a plurality of pans 40 connected by overflow tubes 41, and provided with tubes 42 for the passage of vapors, covered by hoods 43, which are sealed in the liquid carried by the pans. The lower end of the column 39 is connected with a source of heat, which may be live steam by a valved pipe 43ª. The liquid freed from alcohol escapes from the lower end of column 39 by a valved pipe 44 to a plurality of water or weak alcohol receivers 45, 46, which receivers 45, 46, have valved compressed air inlets 47 and 48. Valved outlet pipes 49 and 50 conduct the contents of the receivers 45 and 46 to a valved pipe 51 having a valved outlet pipe 52, which pipe 51 is arranged to convey the liquid from the receivers 45 and 46 to a reservoir 53, which is provided with a valved compressed air connection 54. The alcohol vapors which pass out of the top of the rectifier 16 are conducted into a tubular condenser 55, which is cooled by a current of water introduced by pipe 56 and conveyed away by an overflow pipe 57. The water serves to cool the walls of the parallel vertical vapor pipes which, form the usual tight joint with end plates and the condensate from the tubular condenser 55 passes into a coil condenser 58, which is cooled by the water passing out through the pipe 57, which water finally escapes through an overflow pipe 59. The condensate from the coil 58 passes, by a pipe 60, to the top of the column 39, and is there evaporated and conveyed away by a pipe 61 to a tubular condenser 62, coupled with a coil condenser 63, said tubular and coil condenser 62, 63, being constructed in the same manner as the tubular and coil condenser 55 and 58 previously described. The condensate from the coil 63 passes downwardly by a valved pipe 64 into two strong alcohol receivers 65 and 66, which are provided with valved vacuum connections 67 and 68, leading to a vacuum pipe 69. Said receivers 65 and 66 are, furthermore, provided with valved outlet pipes 70 and 71, leading to a pipe 72, which is connected to the pipe 52, and in this way to the reservoir 53. From the pipe 52 a pipe 73 leads to the supply tank 9.

Any vapors escaping from the top of the tubular condenser 55 pass out by pipe 74 to a suction box 75, which suction box is also connected by a pipe 76 to the top of the tubular condenser 62. The pipe 69 is also connected to the suction box 75. Any condensate accumulating in the suction box 75 is upon occasion drawn off by a pipe 77 and conducted to the supply tank 9. Vacuum is applied to the suction box 75 by means of a pipe 78, which leads to a vacuum pump 79.

In the operation of my apparatus, it will be understood that many different materials may be treated therein and that alcohols of many different kinds and strengths may be operated upon in accordance therewith.

For example, however, I may operate upon an aqueous ethyl alcohol of a low strength, which may have a strength of 5% or higher.

In order to start the operation of the apparatus, the alcohol is charged into the still 1, or may be introduced initially into the supply tank 9, in any desired manner. Furthermore, the preheater 26 will be operated to heat the upper section 22 of the rectifier to the desire temperature, that is to say a temperature depending on the vacuum, but of about 2° C. below the boiling temperature of absolute alcohol at that pressure, but as soon as this temperature has been attained and as soon as vapors are received from the still 1, it will be understood that the preheater 26 will be disconnected and the cooler 29 will be thrown into operation instead, so as to maintain said temperature substantially constant.

The vacuum pump 79 is now operated so as to produce a vacuum of not less than twenty-seven inches of mercury.

The alcohol vapors which pass out from the pipe 12 are discharged into the lower section 15 above the diaphragm 18, and are thence discharged downwardly through the openings 19 around the tubes 20, so that in this way the alcohol vapors become evenly distributed within the lower section 15, so that they will be uniformly supplied through the tubes 20. Any condensate which may accumulate above the diaphragm 18 also passes downwardly through the openings 19 and is received by the cover 36. The alcohol vapors passing into the lower ends of the tubes 20 will have a strength of approximately 42% alcohol. As these vapors pass upwardly in the tubes 20, a portion thereof will become condensed during the travel of the vapors through said tubes, so that by the time the vapors reach the upper ends of the tubes 20 there will be a descending film of condensed water and alcohol extending from the upper to the lower portion of said tubes 20.

Owing to the fact, however, that under the influence of a vacuum solutions of alcohol in water, even when approximating absolute alcohol, are in equilibrium with the vapors evolved therefrom only when said vapors contain a larger percentage of alcohol than the liquid adjacent thereto, the ascending current of vapors in the tubes 20 will become enriched in alcohol by reason of the condensation therefrom of a liquid which is lower in alcohol content than the vapors from which it was derived.

Not only is this the case, but it will be seen that as the current of vapors approaches the upper ends of the tubes 20 the condensate therefrom will be richer in alcohol than the condensate from the vapors entering the lower ends of said tubes 20, inasmuch as the condensate produced at the upper ends of the tubes 20 will be formed from vapors richer in alcohol than the vapors in the lower ends of the tubes 20. Therefore, the tubes 20 contain an ascending current of alcohol vapors becoming increasingly richer in alcohol as they ascend, while the inner walls of said tubes will carry a descending film of aqueous alcohol becoming progressively poorer in alcohol.

Furthermore, because of the reverse directions in which these two currents flow, the vapors at any one point in the tubes 20 will be continually brought into contact with a portion of the film of liquid which is richer in alcohol than a body of aqueous alcohol that would be in equilibrium with the vapors at said point, so that there will result an interchange between the vapors at this point with the liquid with which it is in contact which will increase the percentage of alcohol in the vapors and decrease the percentage of alcohol in the liquid. In this way the increase in the percentage of the alcohol in the current of ascending vapors will become very much accelerated.

When, therefore, the vapors leave the upper ends of the tubes 20, they will be found to very closely approximate pure alcohol, and may, for example, during favorable use of the embodiment of my invention described in detail herein be comprised of 99 or 99.5% alcohol.

The condensate which passes outwardly from the lower ends of the tubes 20, as well as any condensate which passes outwardly from the openings 19, is conveyed by the pipe 38 to about the center of the column 39, where the weak alcohol is subjected to a current of live steam, so that the alcohol vapors, which are small in quantity compared with the volume of liquid supplied through the pipe 60, are removed therefrom and pass upwardly in said column, until the very high-proof alcohol escapes from the top of said column under the influence of the vacuum. The liquid, which would be either water or very weak alcohol, passes out from the bottom of the column 39, and is conveyed by the pipe 44 to the receivers 45 and 46, from which point the same may be discharged by the outlet pipe 51, or may be transferred into the reservoir 53.

The vapors which pass out from the top of the rectifier 16 are conducted to the combined tubular and coil condenser 55 and 58, from which the condensate is conveyed into the top of the column 39, from which point, under the influence of the vacuum, the very high-proof alcohol vapors pass out from the top of the column by means of the pipe 61 to the combined tubular and coil condenser 62 and 63, whence they may be drawn off by the pipe 64 and conveyed into the strong alcohol receivers 65 and 66. From these receivers 65 and 66 the strong alcohol may, if desired, be conveyed to the reservoir 53, and any liquid in said reservoir 53 may upon occasion be forced by compressed air through the pipe 73 into the supply tank 9, and, if desired, returned to the still 1 for further treatment. Any vapors which escape from the top of the condensers 55 and 62 are conveyed by the pipes 74 and 76, respectively, to the suction box 75, and, if any condensate accumulates there, the same is conveyed away by the pipe 77 to the supply tank 9, from which pipe 11 permits withdrawal, or pipe 8 facilitates redistillation.

During the distillation, the progress thereof may be determined by viewing the action of the same through the various windows, tail boxes, etc.

While I have described my invention above in detail, I wish it to be understood that many changes may be made therein without departing from the spirit of the invention. For example, by the term "still" I mean any vapor-supplying means.

I claim:

1. In combination, a still, a tubular rectifier having a vapor outlet and a residual liquid outlet and connected with the vapor outlet of said still, and a column rectifier connected at about its middle portion with the liquid outlet from said tubular rectifier.

2. In combination, a still, a tubular rectifier directly connected to the vapor outlet of the still, a column rectifier, the lower end of the tubular rectifier being connected to the lower portion of the column rectifier, while the upper portion thereof is connected to the upper portion of the column rectifier.

3. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, and a condenser interposed between the upper portion of the tubular rectifier and the upper portion of the column rectifier.

4. In combination, a still, a tubular rectifier connected with the vapor outlet thereof, a column rectifier, and means for applying decreased pressure to the upper portions of the two rectifiers.

5. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, and means for applying decreased pressure to the upper portions of the two rectifiers.

6. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser interposed between the upper portion of the tubular rectifier and the upper portion of the column rectifier, and means for applying decreased pressure to the upper portions of the two rectifiers.

7. In combination, a still, a tubular rectifier connected with the vapor outlet thereof, a column rectifier, and a condenser adapted to receive the vapors escaping from the top of the column rectifier.

8. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, and a condenser adapted to receive the vapors escaping from the top of the column rectifier.

9. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser interposed between the upper portion of the tubular rectifier and the upper portion of the column rectifier, and a condenser adapted to receive the vapors escaping from the top of the column rectifier.

10. In combination, a still, a tubular rectifier connected with the vapor outlet thereof, a column rectifier, means for applying decreased pressure to the upper portions of the two rectifiers, and a condenser adapted to receive the vapors escaping from the top of the column rectifier.

11. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, means for applying decreased pressure to the upper portions of the two rectifiers, and a condenser adapted to receive the vapors escaping from the top of the column rectifier.

12. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser interposed between the upper portion of the tubular rectifier and the upper portion of the column rectifier, means for applying decreased pressure to the upper portions of the two rectifiers, and a condenser adapted to receive the vapors escaping from the top of the column rectifier.

13. In combination, a still, a tubular rectifier connected with the vapor outlet thereof, a column rectifier receiving a liquid fraction from said tubular rectifier, a condenser adapted to receive the vapors escaping from the top of the column rectifier, and means for conveying away the liquids from the condenser and the bottom of the column rectifier.

14. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser adapted to receive the vapors escaping from the top of the column rectifier, and means for conveying away the liquids from the condenser and the bottom of the column rectifier.

15. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser interposed between the upper portion of the tubular rectifier and the upper portion of the column rectifier, a condenser adapted to receive the vapors escaping from the top of the column rectifier, and means for conveying away the liquids from the condenser and the bottom of the column rectifier.

16. In combination, a still, a tubular rectifier connected with the vapor outlet thereof, a column rectifier, means for applying decreased pressure to the upper portions of the two rectifiers, a condenser adapted to receive the vapors escaping from the top of the column rectifier, and means for conveying away the liquids from the condenser and the bottom of the column rectifier.

17. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, means for applying decreased pressure to the upper portions of the two rectifiers, a condenser adapted to receive the vapors escaping from the top of the column rectifier, and means for conveying away the liquids from the condenser and the bottom of the column rectifier.

18. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser interposed between the upper portion of the tubular rectifier and the upper portion of the column rectifier, means for applying decreased pressure to the upper portions of the two rectifiers, a condenser adapted to receive the vapors escaping from the top of the column rectifier, and means for conveying away the liquids from the last-mentioned condenser and the bottom of the column rectifier.

19. In combination, a still, a tubular rectifier connected with the vapor outlet thereof, a column rectifier, a condenser adapted to receive the vapors escaping from the top of the column rectifier, and means for conveying away the liquids from the condenser and the bottom of the column rectifier comprising separate receivers therefor, a common reservoir, and means for returning the liquids from the reservoir to the still.

20. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser adapted to receive the vapors escaping from the top of the column rectifier, and means for conveying away the liquids from the condenser and the bottom of the column rectifier comprising separate receivers therefor, a common reservoir, and means for returning the liquids from the reservoir to the still.

21. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser interposed between the upper portion of the tubular rectifier and the upper portion of the column rectifier, a condenser adapted to receive the vapors escaping from the top of the column rectifier, and means for conveying away the liquids from the last-mentioned condenser and the bottom of the column rectifier comprising separate receivers therefor, a common reservoir, and means for returning the liquids from the reservoir to the still.

22. In combination, a still, a tubular rectifier connected with the vapor outlet thereof, a column rectifier, means for applying decreased pressure to the upper portions of the two rectifiers, a condenser adapted to receive the vapors escaping from the top of the column rectifier, and means for conveying away the liquids from the condenser and the bottom of the column rectifier comprising separate receivers therefor, a common reservoir, and means for returning the liquids from the reservoir to the still.

23. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, means for applying decreased pressure to the upper portions of the two rectifiers, a condenser adapted to receive the vapors escaping from the top of the column rectifier, and means for conveying away the liquids from the condenser and the bottom of the column rectifier comprising separate receivers therefor, a common reservoir, and means for returning the liquids from the reservoir to the still.

24. In combination, a still, a tubular rectifier connected with the vapor outlet thereof, a column rectifier, the lower end of the tubular rectifier being connected to the middle portion of the column rectifier, while the upper portion thereof is connected to the upper portion of the column rectifier, a condenser interposed between the upper portion of the tubular rectifier and the upper portion of the column rectifier, means for applying decreased pressure to the upper portions of the two rectifiers, a condenser adapted to receive the vapors escaping from the top of the column rectifier, and means for conveying away the liquids from the condenser and the bottom of the column rectifier comprising separate receivers therefor, a common reservoir, and means for returning the liquids from the reservoir to the still.

25. The combination with a source of mixed vapors of separating means comprising a tortuous path through which vapors may be evacuated and an unobstructed path through which a condensate may descend, toward a rectifier.

26. The combination with a source of mixed vapors of separating means provided with alternative means for heating or for cooling, which separating means comprises a tortuous path through which the vapors may be evacuated and an unobstructed path through which a condensate may descend, toward a column rectifier.

27. The combination with a source of mixed vapors of separating means comprising a tortuous path through which vapors may be evacuated, and an unobstructed path through which a condensate may descend, and also means external to said separating means for the refractionation of each of the products obtained therefrom.

28. The combination with a source of mixed vapors of separating means comprising a tortuous path through which vapors may be evacuated, and an unobstructed path through which a condensate may descend, and also means, external to said separating means, for the refractionation of the resultant products in interconnected regions of a single rectifier.

29. The combination with a source of mixed vapors of separating means comprising a tortuous path through which vapors may be evacuated, and an unobstructed path through which a condensate may descend, and also means, external to said separating means, for the refractionation of the resultant products in interconnected regions of a column rectifier.

30. The combination with a source of mixed vapors of separating means comprising a tortuous path through which vapors may be evacuated, and an unobstructed path through which a condensate may descend, and also means, external to said separating means, for the refractionation of the resultant products in interconnected regions of a column rectifier whose vapor outlet is maintained under a reduced pressure.

In testimony that I claim the foregoing I have hereunto set my hand.

ERNEST JEROME WINTER.

Witnesses:
JOHN P. GISCHEL,
ARTHUR WRIGHT.